Sept. 15, 1970             F. J. SMITH             3,528,179
MICROWAVE FLUIDIZED BED DRYER
Filed Oct. 28, 1968                                                2 Sheets-Sheet 1
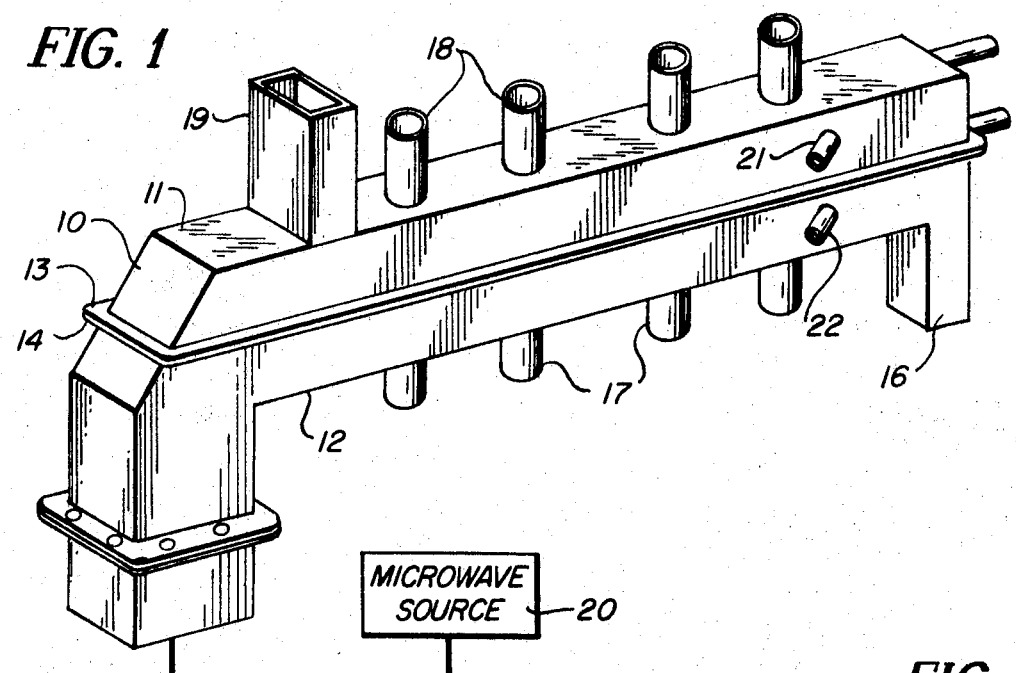
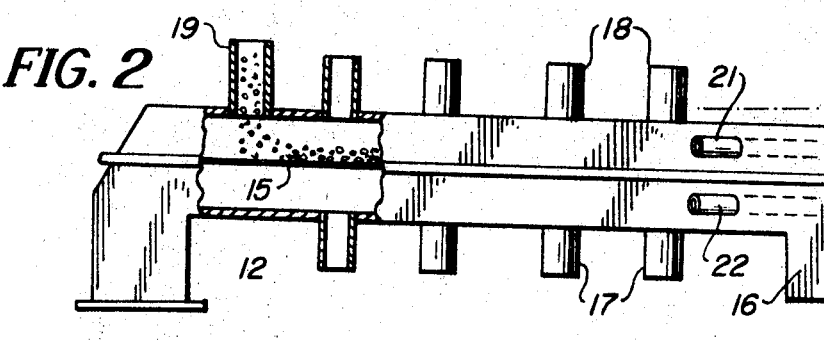 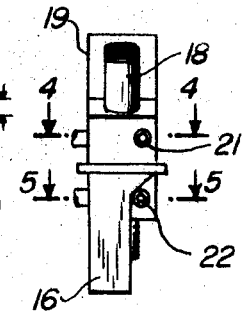
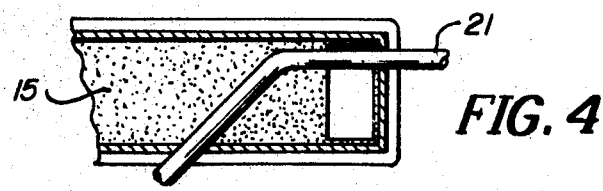
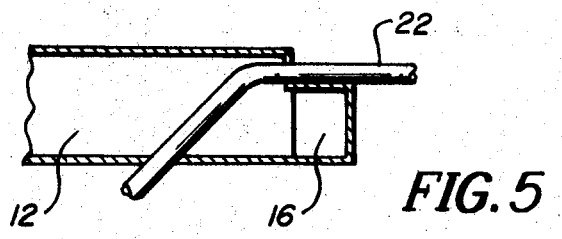
INVENTOR.
FRANKLIN J. SMITH Sept. 15, 1970  F. J. SMITH  3,528,179

MICROWAVE FLUIDIZED BED DRYER

Filed Oct. 28, 1968  2 Sheets-Sheet 2

INVENTOR.
FRANKLIN J. SMITH
BY
Carl C. Batz
ATTY.

United States Patent Office 3,528,179
Patented Sept. 15, 1970

3,528,179
MICROWAVE FLUIDIZED BED DRYER
Franklin J. Smith, Diablo, Calif., assignor to Cryodry Corporation, San Ramon, Calif., a corporation of California
Filed Oct. 28, 1968, Ser. No. 771,128
Int. Cl. H05b 9/06
U.S. Cl. 34—1
8 Claims

ABSTRACT OF THE DISCLOSURE

An apparatus and method for drying granular products in which a fluid-bed dryer is configured to act as a waveguide for microwave energy and the fluidized-bed of material is rapidly dried through the addition of microwave heating.

BACKGROUND OF THE INVENTION

Within modern technology there exist numerous requirements for the drying of granular products. For example, the food processing industry provides wide application of drying techniques in the processing of grains, vegetables, berries, and the like.

Various techniques have been suggested to accomplish the necessary drying, one of the simplest being exposure to sunlight for prolonged periods. Other suggested methods include heating or baking in the conventional ovens or kilns. These techniques are not entirely satisfactory for a number of reasons. For instance, drying by sunlight is a relatively slow process, and is dependent upon favorable climate and weather conditions. The use of ovens and kilns is also relatively slow and may produce undesirable changes in the characteristics of the processed materials.

More recently, the application of fluidized-bed techniques in the drying of granular products has been suggested. While these methods may be more efficient and preferable to older methods, there remains much room for improvement, particularly as attempts are made to expand the application of these processes to an increasingly larger scale.

Fludized-bed drying is accomplished through a combination of convective and conductive heating principles. The heated fluidizing gas surrounds each granular particle in the bed and transfers heat to the surface of the particles. The heat is passed to the interior of the particles by conduction, where it ultimately drives the internal moisture to the surface where it can be transferred to the fluidizing gas. The intimate relationship between the fluidizing gas and the bed particles creates favorable conditions for heat transfer and evaporation at the particle surfaces.

It has been discovered that this drying process can be very significantly accelerated by passing microwave energy through the fluidized-bed. It is believed that the rapid drying which can be obtained through the addition of microwave energy to the fluidized bed is attributable to the fact that microwave energy produces an inductive type of heating, causing the particles in the bed to be heated from the inside out, thereby driving the moisture rapidly from the interior of the particle to its surface where the moisture comes under the greatest influence of the fluidizing gas.

In order to successfully utilize microwave energy in a commercial operation a number of problems must be met and overcome. With the discovery that the addition of microwave energy to a fluidized-bed dryer will produce very desirable results, it remains to provide a fluidized-bed dryer that will allow the introduction of microwave energy to its operation.

It is an object of the present invention therefore to provide a fluid-bed drying apparatus in which microwave energy can be used to accelerate the drying rate.

A further object of the invention is to provide an apparatus and method for the rapid and efficient drying of granular products.

A still further object of the present invention is to provide an apparatus in which fluidized-bed and microwave energy drying techniques can be combined.

Further objects and advantages of the present invention will be discussed and become apparent as the specification proceeds.

The apparatus of the present invention may comprise a fluid-bed dryer configured to act as a waveguide at microwave energy frequencies, the waveguide being divided into two portions by a gas-porous, electrically transparent membrane installed transversely of the vertical walls of the dryer. Inlet and outlet ducts may be provided for continuously introducing material to be treated into the chamber, and withdrawing dried product therefrom. Gas inlet and exit ports are also provided for the flow of fluidizing gas through the dryer.

Specific embodiments of the invention will be described in detail by reference to the accompanying drawings in which:

FIG. 1 is a perspective view of one embodiment of the apparatus;

FIG. 2 is a plan view of the embodiment of FIG. 1;

FIG. 3 is a side view in elevation of the embodiment of FIG. 1;

FIG. 4 is a partial section plan view taken along line 4—4;

FIG. 5 is a partial section plan view taken along line 5—5;

Figure 6:
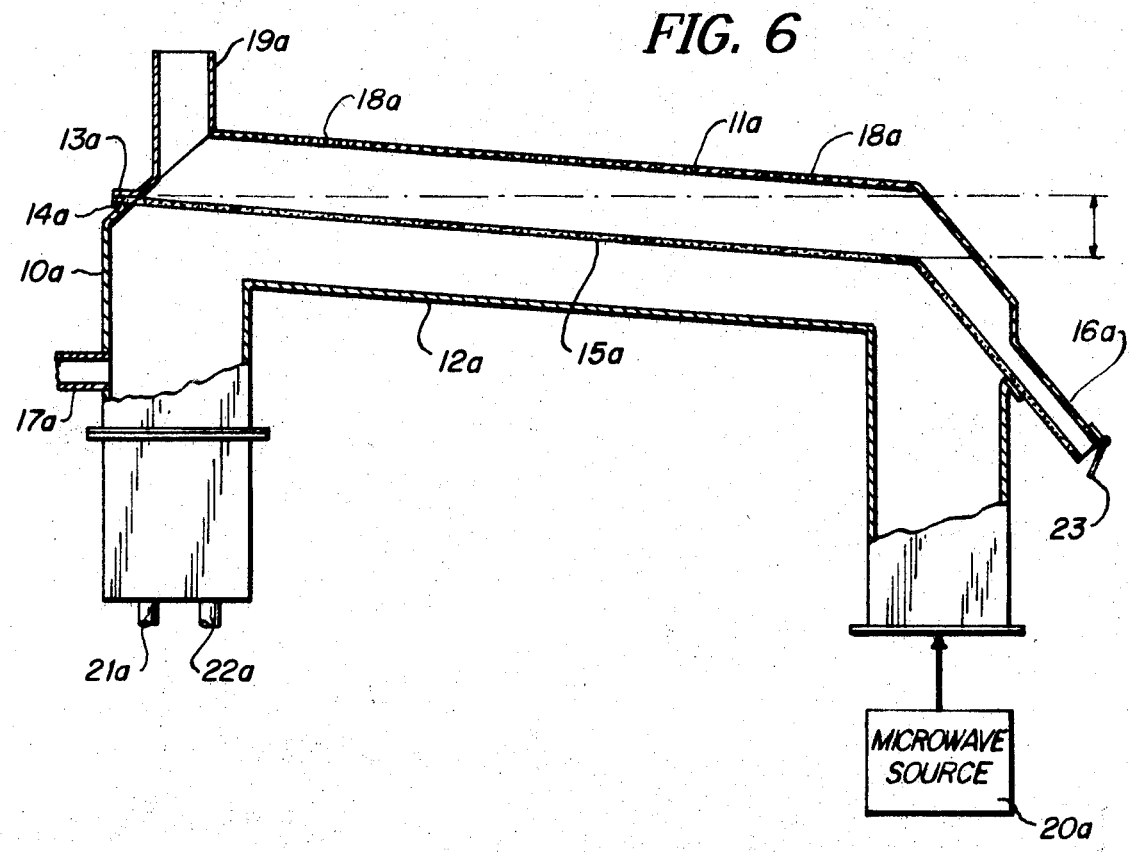
FIG. 6 is a front view in elevation of another embodiment of the apparatus and partially cut-away.

Referring particularly to the embodiment illustrated in FIGS. 1-5 of the drawings, 10 is a transmission waveguide composed of an upper portion 11 and a lower portion 12. Upper portion 11 has a flange 13 about its lower circumference, and lower portion 12 has a flange about its upper circumference, the lower portion and upper portion being joined at flanges 13 and 14. Upper portion 11 and lower portion 12 may be joined in a manner which will allow easy opening or separation of the portiòns to provide ready access to the interior of waveguide 10. Membrane 15 is captured between flanges 13 and 14 and transversely separates upper portion 11 and lower portion 12. Membrane 15 may be of a variety of materials which are porous or permeable and will readily pass air or other suitable gas, but are impervious to the material to be treated. The membrane should also have a low dielectric loss factor for microwave energy, and preferably is electrically transparent. A variety of materials are available for this application including various nylon fabrics, porous ceramics, and glass wool, but the invention is in no way limited to any particular fabric or material.

Membrane 15 stretches completely across the width and length of waveguide 10, dividing the waveguide into an upper portion and a lower portion. However, in the particular embodiment illustrated in FIG. 1, the membrane is apertured at the discharge end of waveguide 10 in the area above material output duct 16, as shown in detail in FIGS. 4 and 5. In this embodiment the treated material is allowed to pass from upper portion 11 through lower portion 12 and be discharged through output duct 16 by means of the aperture provided.

It will be noted that the height of the vertical walls of waveguide 10 is greater than the width of the top and bottom walls of waveguide 10. That is, the side or vertical walls are the broad walls of the waveguide, whereas the top and bottom walls are the narrow walls of the waveguide. The significance of this feature will be more fully described hereinafter.

A material inlet duct 19 is provided in top wall of waveguide 10, the duct being oriented across the width of the top wall of the waveguide. Material output duct 16 is provided at the opposite end of waveguide 10 oriented across the bottom wall of the waveguide.

Gas inlet ports 17 are spaced lengthwise of the bottom wall of waveguide 10, and gas outlet or exhaust ports 18 are spaced lengthwise of the top wall of waveguide 10. It will be understood that the invention is not limited to any specific number of gas inlet or outlet ports and that the plurality shown in the drawing is intended to be illustrative only. There may be only one gas inlet port and one outlet port, or there may be a plurality of either or both. Moreover, the gas inlet ports may be each connected to an independent source of gas, or they may be interconnected by a manifold means (not shown) and supplied with gas from a single source. Similarly, when a plurality of outlet ports is employed, the outlet ports may be interconnected by a manifold means (not shown). If desired, inlet ports 17 and outlets ports 18 may be interconnected through means not shown to provide for a continuous recirculation of the treating gas. Preferably air is used as the treating gas, but the invention is not limited thereby and other gases can be used as desired for particular materials and conditions.

In one embodiment of the invention the source of microwave energy 20 may be located at the material inlet end of waveguide 10, which source may be selected from a variety of available microwave generators such as the microton, magnetron, klystron and the like. In the preferred embodiment shown in the drawings, waveguide 10 is curved 90° at the input end. In this manner, the installation of microwave source 20 does not interfere with the continuity of membrane 15. It is to be understood however, that this particular configuration is preferred, and that other configurations can be arranged for terminating the membrane 15 when the microwave energy source is located at the inlet end of waveguide 10.

Load tubes 21 and 22 may be arranged near the discharge end of waveguide 10, passing through the upper and lower portions thereof. In this embodiment, output duct 16 is dimensioned to allow load tube 22 to pass through the end wall of waveguide 10 without interference with the outflow of treated material, as shown in FIGS. 3, 4 and 5. Load tubes 21 and 22 may be coupled to a source of water or other lossy liquid not shown, and provision made for the continuous circulation of the liquid through load tubes 21 and 22.

It has been observed that when microwave energy is transmitted through waveguides of various geometric shapes and dimensions, varying electric and magnetic fields may be set up in the waveguides. In the apparatus of the present invention it is preferred that waveguide 10 be of rectangular cross-section dimensioned so as to propagate only the $TE_{10}$ mode. This mode has a maximum electric field at the center of a broad wall of the waveguide and normal to the broad wall. It has also been observed that maximum coupling of microwave energy to a thin or granular product occurs when the product is located within the maximum electric field oriented parallel to the product. In the apparatus of the present invention this is accomplished through the provision of membrane 15 transverse of the broad walls of waveguide 10.

Still another characteristic of a rectangular waveguide propagating the $TE_{10}$ mode is that a longitudinal slot may be present at the mid-point of the broad walls without significant leakage of microwave energy. In the apparatus of the present invention, upper portion 11 is joined to lower portion 12 to form waveguide 10 having the broad walls oriented vertically. Upper portion 11 is separated from lower portion 12 by membrane 15, which creates a slot, electrically speaking, due to the dielectric characteristics of the membrane. However, since the slot occurs in the broad walls of waveguide 10, the loss of microwave energy caused thereby is insignificant.

It has also found that microwave energy will not propagate through a duct having sufficiently small dimensions relative to the wavelength of the microwave energy. In the present apparatus, material inlet duct 19, output duct 16, and gas ports 17 and 18 are preferably dimensioned so as to function as waveguides beyond cutoff, thereby preventing the escape of microwave energy from waveguide 10 through ducts 16 and 19, and ports 17 and 18.

Preferably, the dimension of ducts 16 and 19 and ports 17 and 18 measured along the longitudinal axis of waveguide 10 is less than ½ the wavelength of the microwave energy propagated through waveguide 10, in the embodiment illustrated in FIGS. 1 through 5.

When microwave energy is introduced into a waveguide or chamber, it is preferred that as much of the energy as possible is absorbed, in order to prevent the energy from being reflected back to the microwave generator which may cause serious damage to the generator. When microwave energy is used in heating and drying substances, it is preferred that the total energy output of the microwave generator be absorbed by the material to be treated in order to operate at maximum efficiency. However, this ideal absorption may not be attained, and any excess microwave energy will vary with the material treated, the volume of material, the throughput speed and so forth. In order to provide for these variances, load tubes 21 and 22 are provided near the output end of waveguide 10. A lossy liquid, such as water, is circulated through the load tubes to absorb any excess microwave energy not absorbed by the material treated.

Figure 7:
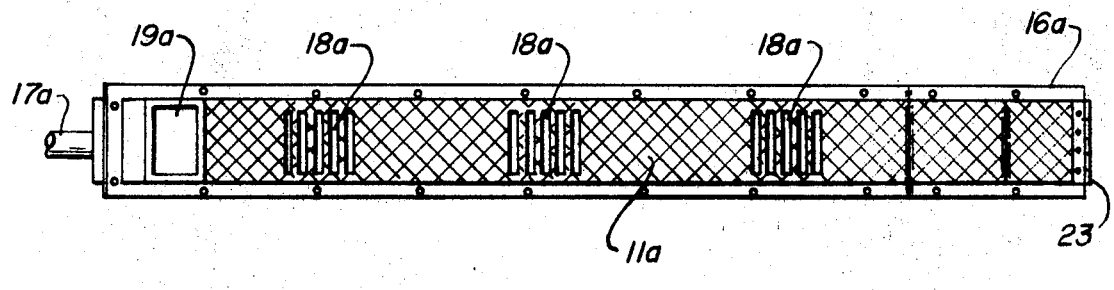
FIG. 7 is a plan view of the embodiment shown in FIG. 6.

Referring particularly to FIGS. 6 and 7, still another embodiment of the apparatus of the present invention is illustrated. In this embodiment, upper portion 11a of waveguide 10a may be of a perforated material lined with a transparent polyethylene-type film material with a low loss factor such as Du Pont's Mylar brand. In this configuration, the product to be treated is viewable through upper portion 11a as it passes through waveguide 10a.

In this embodiment, microwave energy may be introduced into the waveguide at the product output end of the waveguide from microwave energy source 20a. Load tubes 21a and 22a are provided at the product input end of the waveguide to absorb any microwave energy not dissipated in the product being treated.

Treating gas is introduced into waveguide 10a through port 17a. The gas may be exhausted from the waveguide through one or more slots 18a in the liner of upper portion 11a allowing gas flow through the perforations in the waveguide upper portion 11a.

In this embodiment, waveguide 10a is angled through 90° at the product output end, preferably a series of angular portions of less than 90° are successively arranged to form the full 90° angle. Output duct 16a projects outwardly from the angular portion of upper portion 11a, dimensioned so as to be beyond cut-off for the microwave energy propagated through waveguide 10a. If desired, flap valve 23 may be provided at the end of duct 16a to aid in controlling product flow through the duct. Through the use of an angular portion at the output end of waveguide 10a, membrane 15a need not be apertured to allow product flow through the outlet duct 16a as was provided in the previously described embodiment.

It can be seen that the dimensions of waveguide 10 and input and outlet ducts 16 and 19 can be widely varied according to the microwave energy propagated through the waveguide, and the invention is in no way limited to a particular microwave frequency or to particular dimensions. At the present time the use of various frequencies is controlled by the Federal Communications Commission, and 915 megacycles and 2450 megacycles have been designated for industrial, scientific and medical use (ISM frequencies).

It has been observed that when using microwave energy at 2450 MHz., the vertical or broad walls of waveguide 10 are preferably from about 2.84" to 4.3", in order to establish the $TE_{10}$ mode. At the 915 MHz. range, the vertical or broad wall dimension is preferably 7.75" to 12". The narrow or top and bottom walls can be varied to adjust electric field intensities, but in order to avoid higher order modes should be less than ½ the wavelength in free space of the microwave frequency used. The length of the structure can be varied according to the attenuation rate of the particular product to be dried.

OPERATION

In the operation of the present apparatus and method, a granular material to be treated is positioned along membrane 15 and supported thereby. The material may be placed upon membrane 15 by separating upper portion 11 from lower portion 12, placing the material along membrane 15, and rejoining upper portion 11 to lower portion 12 as in a batch type operation. Preferably, the granular material is admitted through inlet duct 19 and caused to flow along the membrane by providing an adequate slope. The slope may be introduced by arrangement of waveguide 10 in a manner in which the input end is higher than the output end.

As the bed of material to be dried is thus established, ambient or heated air or other suitable gas is introduced into lower portion 12 through inlet ports 17. The gas readily passes upwardly through membrane 15, through the granular bed of material to be treated, and is exhausted through outlet ports 18. The velocity of the gas passing through the bed of material may be adjusted so that the frictional drag on the particles will become equal to the effective weight of the bed, that is, velocity for the bed of material being treated. When this velocity is reached, the bed of material is in a state of incipient or quiescent fluidization. The velocity of the gas may be further increased to produce a boiling bed of granular material, sometimes referred to as a standard fluid bed. In this condition, the fluidized mixture of granular material is in the state of a quietly "boiling" fluid. In this state, the surfaces of the particles of granular materials are in intimate contact with the treating gas, allowing for maximum heat transfer and evaporation between the gas and the granular particles.

As the fluidized-bed is established in the waveguide 10, microwave energy source 20 is energized. The microwave energy is propagated through the waveguide 10 and is repeatedly reflected between the opposing walls thereof, preferably the microwave input is adjusted so that the $TE_{10}$ mode is established within the waveguide. The microwave energy continuously passes through the fluidized-bed of material and a portion of the microwave energy is absorbed by the particles within the bed, causing the particles to be heated.

The influence of microwave energy acting upon the fluidized bed of material produces very rapid drying. The microwave energy essentially heats the particles in the bed from the inside, driving the moisture to the surfaces of the particles. At the same time, the heat transfer between the particles, especially at their surfaces, and the fluidizing gas rapidly completes the heating of the outer portions of the particles, and provides for rapid evaporation of the surface moisture.

In the preferred embodiment, the granular particles in the fluidized bed continue along membrane 15 to the output end of waveguide 10, the particles being subjected to microwave energy and the fluidizing gas as they pass along the waveguide. Membrane 15 may terminate at output duct 16, especially when it is desired to operate the apparatus on a continuous process basis. In this embodiment, the treated material is discharged from membrane 15 and exits from waveguide 10 through output duct 16. Microwave energy not absorbed by the treated material is absorbed by the lossy liquid in load tubes 21 and 22.

The advantages derived in drying granular products by use of the described apparatus and method are numerous. The apparatus allows for the efficient addition of microwave energy to the fluid-bed dryer through the unique waveguide configuration of the dryer.

The drying technique produced is more rapid and effective than either fluid-bed techniques or microwave heating taken alone, and is more rapid and effective than a simple sum of the component techniques.

Fluidized-bed techniques of drying have been favored primarily for the large capacity for heat transfer between the particles and the fluidizing gas. Fluid-bed drying becomes less efficient as the volume and density of the bed particles increases because the maximum heat transfer and thus efficiency takes place at the particle surfaces, and the method depends upon the heat conductive properties of the material to convey the heat to the interior of the particles. Through the coupling of microwave energy to the fluidized-bed of material, heat may be induced directly in the interior of the particles, driving the moisture to the surface where the fluidizing gas can have its maximum effects. This produces a highly effective and efficient fluidized-bed drying apparatus and method.

While certain specific aspects and embodiments of the present apparatus and method have been set out in detail herein, it will be understood that such is intended to be illustrative and not limiting, and that the invention is to be defined by the scope of the appended claims.

I claim:

1. A fluidized-bed dryer apparatus for treating granular products comprising an elongated enclosed waveguide having a low loss gas-porous membrane dividing said waveguide into two portions; means for directing a fluidizing gas into the bottom portion of said wave-guide through said membrane, so as to establish a fluidized bed with said granular products and a microwave energy source adapted to propagate microwave energy through said waveguide.

2. A fluidized-bed dryer apparatus for treating granular products with microwave energy comprising a rectangular waveguide consisting of an upper portion and a lower portion, a low loss gas-porous membrane circumferentially captured between said upper and lower portions and adapted to receive a granular product thereon, gas ports communicating with said waveguide to direct a flow of fluidizing gas through said membrane, and duct means communicating with said waveguide adapted to permit the flow of granular product into and out of said waveguide.

3. The apparatus according to claim 2 wherein said waveguide is dimensioned to propagate the $TE_{10}$ mode at a microwave energy frequency of 2450 MHz.

4. The apparatus according to claim 2 wherein said waveguide is dimensioned to propagate the $TE_{10}$ mode at a microwave energy frequency of 915 MHz.

5. The apparatus according to claim 2 wherein said duct means communicate with said upper portion of said waveguide.

6. The apparatus according to claim 2 wherein said duct means adapted to permit the flow of granular product out of said waveguide communicates with said lower portion of said waveguide.

7. The apparatus according to claim 6 wherein said membrane contains an aperture adapted to permit the flow of granular product through said duct means.

8. An apparatus for drying granular material comprising a rectangular waveguide divided transversely of the broad wall thereof by a low loss gas-porous membrane, means communicating with the lower portion of said waveguide for the introduction of fluidizing gas flow into said waveguide, means communicating with the upper portion of said waveguide for the outflow of fluidizing gas from said waveguide, and a source of microwave energy adapted to propagate microwave energy through said waveguide.

References Cited

UNITED STATES PATENTS

| | | | |
|---|---|---|---|
| 2,560,903 | 7/1951 | Stiefel | 219—10.55 |
| 3,434,220 | 3/1969 | Forster | 34—1 |

WILLIAM E. WAYNER, Primary Examiner

U.S. Cl. X.R.

34—10; 219—10.55